E. BÖSINGER.
PROCESS FOR THE MANUFACTURE OF GLASS SIGN BOARDS.
APPLICATION FILED NOV. 9, 1908.

1,024,551. Patented Apr. 30, 1912.

UNITED STATES PATENT OFFICE.

ENGELBERT BÖSINGER, OF DRESDEN, GERMANY.

PROCESS FOR THE MANUFACTURE OF GLASS SIGN-BOARDS.

1,024,551.     Specification of Letters Patent.     Patented Apr. 30, 1912.

Application filed November 9, 1908. Serial No. 461,789.

*To all whom it may concern:*

Be it known that I, ENGELBERT BÖSINGER, engineer, a subject of the German Emperor, residing at 18 Haydnstrasse, Dresden, Saxony, Germany, have invented a certain new and useful Process for the Manufacture of Glass Sign-Boards, of which the following is a specification.

It has already been proposed to render large sign-boards or advertisement-boards consisting of comparatively thin sheets of glass better adapted to resist fracture and to protect the letters attached to their rear side against injury from the alternate effects of sunshine and rain by covering them on the rear side with a layer of cement. Experience has, however, shown that sign-boards of comparatively large dimensions, when thus covered with a cement layer become warped and are liable to burst while the acids contained in the cement penetrate and destroy the letters. Now in accordance with this invention, for the purpose of obviating these defects, there is placed between the glass sheet and the layer of cement, or substituted for this layer, a layer composed of a mixture of casein, talc, and chalk, which by the addition of water and milk has been brought to the consistency of a paste and to which any desired color has been imparted by the addition of a linseed oil pigment.

Figure 1:
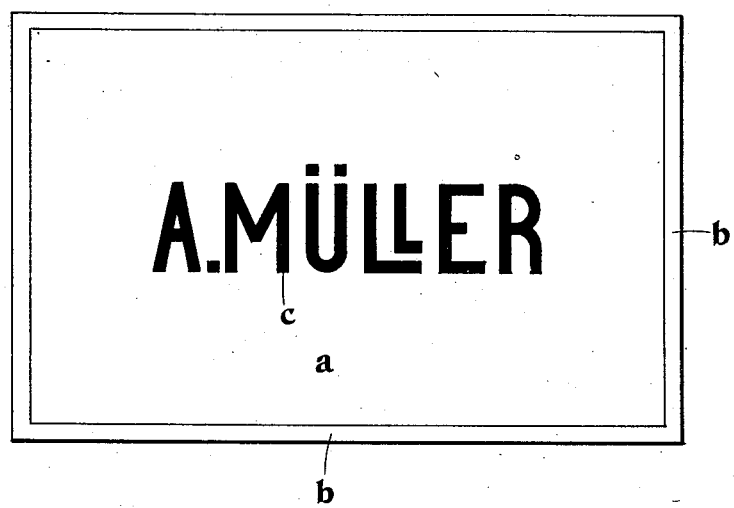
Figure 2:
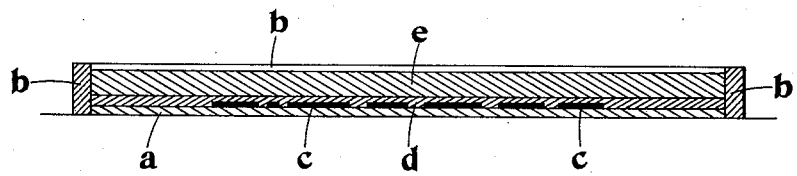

In the accompanying drawing, which by way of example, illustrates a mode of carrying out the invention, Figure 1 shows a glass sign-board in front view, and Fig. 2 shows the same in cross section.

The procedure may advantageously be as follows:—The sheet of glass $a$ is furnished with a wooden frame $b$ projecting beyond its rear side and is then placed on a table or the like with its rear side upward. After the letters $c$ have been attached to it, the mixture above referred to is spread uniformly over the sheet $a$ in a layer $d$ according to the thickness of the letters $c$, from 2 to 5 mm. deep. After this layer $d$ has set its entire surface is roughened by means of a fork-like tool, and when it has completely hardened, it is covered with a layer $e$ composed of a paste-like mixture of powdered marble, alum, and liquid casein obtained by dissolving casein for example in a borax solution. This layer $e$ may be of a depth of about 10 mm. or if desired the first layer $d$ may be of a depth of from 12 to 15 mm., in which case the second layer $e$ can be dispensed with. The proportions of the first layer are preferably as follows: 100 grams of casein, 50 grams of talc, 25 grams of chalk and 15 grams of linseed oil pigment.

What I claim as my invention and desire to secure by Letters Patent is:—

A process for the manufacture of glass sign boards consisting of attaching the letters to the rear side of the glass sheet, covering this side and the letters with a protecting layer composed of a paste-like mixture of casein, talc, chalk, water and milk, and in covering this protecting layer, after it has hardened, with a strengthening layer composed of a paste-like mixture of powdered marble, alum and liquid casein.

In testimony whereof I have hereunto signed my name to this specification in the presence of two subscribing witnesses.

ENGELBERT BÖSINGER.

Witnesses:
PAUL ARRAS,
CLÄRE SIMAN.